United States Patent [19]

Doshi

[11] Patent Number: 4,664,882
[45] Date of Patent: May 12, 1987

[54] SEGMENTED FUEL AND MODERATOR ROD

[75] Inventor: Pratap K. Doshi, Murrysville Boro, Pa.

[73] Assignee: Westinghouse Electric Corp., Pittsburgh, Pa.

[21] Appl. No.: 654,699

[22] Filed: Sep. 26, 1984

[51] Int. Cl.⁴ .............................................. G21C 3/32
[52] U.S. Cl. .................... 376/423; 376/420; 376/424; 376/435; 376/443; 376/444; 376/456
[58] Field of Search ............... 376/423, 424, 420, 443, 376/444, 455, 456, 435

[56] References Cited

U.S. PATENT DOCUMENTS

| | | |
|---|---|---|
| 3,274,067 | 9/1966 | Greebler et al. |
| 3,350,275 | 10/1967 | Venier et al. |
| 3,396,078 | 8/1968 | Visner |
| 3,466,226 | 9/1969 | Lass |
| 3,799,839 | 3/1974 | Fischer et al. |
| 3,802,995 | 4/1974 | Fritz et al. |
| 4,089,742 | 5/1978 | Amaral ............................... 376/440 |
| 4,326,922 | 4/1982 | Farrari ............................... 376/435 |
| 4,591,479 | 5/1986 | Weitzberg ......................... 376/435 |

OTHER PUBLICATIONS

MND-M-1853(Add I), pp. III-13 through III-30, 1961.

Primary Examiner—Donald P. Walsh

[57] ABSTRACT

A segmented fuel and moderator rod and fuel assembly for a BWR. The segmented rod has a lower fuel region and an upper moderator region for passing coolant having a void fraction of between about 0-20% through the upper portion of the BWR core which is normally undermoderated. The segmented rod displaces one or more conventional fuel rods in the fuel bundle. A method of moderating a BWR core is also disclosed.

14 Claims, 3 Drawing Figures

○ FUEL ROD
◍ WATER ROD
⊗ TIE ROD
✳ SEGMENTED ROD

SEGMENTED FUEL AND MODERATOR ROD

BACKGROUND OF THE INVENTION

1. Field of the Invention:

The present invention generally relates to nuclear fuel assemblies for use in nuclear reactors, and more particularly, to a new and improved nuclear fuel assembly especially adapted for use in a boiling water reactor (BWR) to improve the undermoderated condition which typically exists at the top of BWR fuel assemblies.

2. Description of the Prior Art:

The generation of a large amount of heat energy through nuclear fission in a nuclear reactor is well known. This energy is dissipated as heat in elongated nuclear fuel rods. A plurality of nuclear fuel rods are grouped together to form separately removable nuclear fuel assemblies. A number of such nuclear fuel assemblies are typically arranged in a matrix to form a nuclear reactor core capable of a self sustained, nuclear fission reaction. The core is typically submersed in a fluid, such as light water, that serves as a coolant for removing heat from the nuclear fuel rods and as a neutron moderator.

A typical nuclear fuel assembly may be formed by a 7×7 or an 8×8 array of spaced apart, elongated rods supported between upper and lower tie plates. Examples of such typical nuclear fuel assemblies are depicted and described in U.S. Letters Pat. Nos. 3,350,275; 3,466,226; and 3,802,995. In a typical boiling water reactor a nuclear fuel assembly having an 8×8 array, the sixty four rods that form the array may be either sixty four fuel rods or may contain one or more non fueled, water moderator rods with remaining rods being fuel rods. A common problem in typical boiling water reactor nuclear fuel assemblies of the types depicted in the above identified patents is that the central region of such fuel assemblies may be under moderated and over enriched. In order to increase the flow of moderator, one or more of the above-mentioned elongated, water moderator rods may be substituted for fuel rods in the central region of such nuclear fuel assemblies. For example, water moderator rods 41 and 42 are depicted in and described in the above identified '995 Patent. However, the use of such moderator rods significantly reduces the amount of fuel in the core since each moderator rod deplaces a fuel rod in the core lattice and contains no fuel.

Other fuel assembly designs, such as that depicted and described in commonly assigned, copending U.S. patent application Ser. No. 368,555 filed on Apr. 15, 1982 utilizes an elongated flow channel which is divided into four separate fuel sections by a central water cross. In the water cross type fuel assembly, each fuel section is provided with an elongated fuel subassembly or mini-bundle, particularly a 4×4 fuel rod array.

Both the water tubes of the 8×8 array or the water cross of the mini-bundle type of fuel assembly conducts subcooled water from the bottom of the reactor core to the top of reactor core. While the top of the core requires such additional moderator, the bottom of the core is already adequately moderated and does not require such additional moderation.

A typical BWR fuel assembly, such as those discussed above, are highly heterogeneous. The void content or steam fraction in the core varies axially from zero percent at the bottom of the core to about seventy percent at the top of the core. The average void content at the center of the core being from about twenty to forty percent. It is for this reason that the core is over moderated at the bottom and highly under moderated at the top. The undermoderation at the top means that an unfavorable hydrogen to uranium ratio (H/U) exists which results in less burnup and therefore a fuel cycle cost penalty. This is true even where a BWR lattice has been optimized with regard to the H/U ratio since such optimization improves the moderation at an average void content only and the penalty due to the high void content at the top half of the fuel assembly is still present.

Fisher et al, in U.S. Letters Pat. No. 3,799,839 discloses an arrangement for providing a stationary power distribution in the core which involves introducing spatially distributed burnable poison into fuel lattice which is intended to match the exposure dependent control requirements of the core throughout the operating cycle in order to minimize peaking factors.

However, a need still exists to improve the H/U ratio at the top of the fuel assembly without introducing additional moderation at the bottom of the fuel assembly.

SUMMARY OF THE INVENTION

An object of the present invention is to provide a new and improved nuclear fuel assembly.

Another object of the present invention is to provide a new and improved nuclear fuel assembly especially adapted for use in BWRs.

A further object of the present invention is to provide a new and improved nuclear fuel assembly that includes replacing one or more conventional fuel rods with segmented fuel and moderator rods to introduce additional moderator at the top of fuel assembly.

A further object of the invention is to provide a novel segmented fuel and moderator rod.

A further object of the present invention is to provide a new and improved nuclear fuel assembly that has an improved H/U ratio at the top of the fuel assembly.

A still further object of the present invention is to provide a new and improved nuclear fuel assembly capable of more completely burning the fuel in the core and thus lowering the fuel cycle costs.

A further object of the present invention is to provide a method for moderating BWR fuel assemblies.

These as well as other objects and advantages and novel features of the present invention are realized by providing a segmented fuel and moderator rod which comprises a lower fuel region containing a column of nuclear fuel and an upper moderator region, disposed above the fuel region for passing moderator through an upper portion of the nuclear fuel assembly. In another aspect of the invention, a nuclear fuel assembly for a BWR core is provided which comprises a fuel bundle including a plurality of elongated nuclear rods held in a spaced apart laterally array in predetermined lattice positions between upper and a lower tie plates. A flow channel is provided for enclosing the fuel bundle. A base member is secured to the flow channel and provided with means for supporting the fuel bundle within the flow channel. Base member further comprises a nozzle for admitting moderator coolant into the fuel assembly. At least one segmented fuel and moderator rod is disposed in the fuel bundle at a fuel rod lattice position. The segmented rod includes a lower fuel region containing a column of nuclear fuel and an upper moderator region having an aperture for passing moderator through the moderator region for improving the H/U ratio of the upper portion of the fuel assembly.

In accordance with another aspect of the present invention, a method of moderating a normally under moderated upper portion of the BWR fuel assembly is disclosed. The method comprises the steps of passing coolant and moderator through a fuel bundle of the fuel assembly and providing at least one segmented fuel and moderator rod in the fuel bundle; the segmented fuel and moderator having an upper moderator flow region and a lower fuel region. The method further comprises the step of passing a portion of coolant/moderator having a substantially constant void fraction of between 0-20 percent through the moderator flow region of the segmented rod to thereby improve the H/U ratio of the upper portion of the fuel assembly.

A BRIEF DESCRIPTION OF THE DRAWINGS

The accompanying drawings, which are incorporated in and form a part of this specification, illustrate a preferred embodiment of the present invention and, together with the description, serve to explain the principles of the present invention. In the drawings.

DETAILED DESCRIPTION OF THE PREFERRED EMBODIMENT

Figure 1:
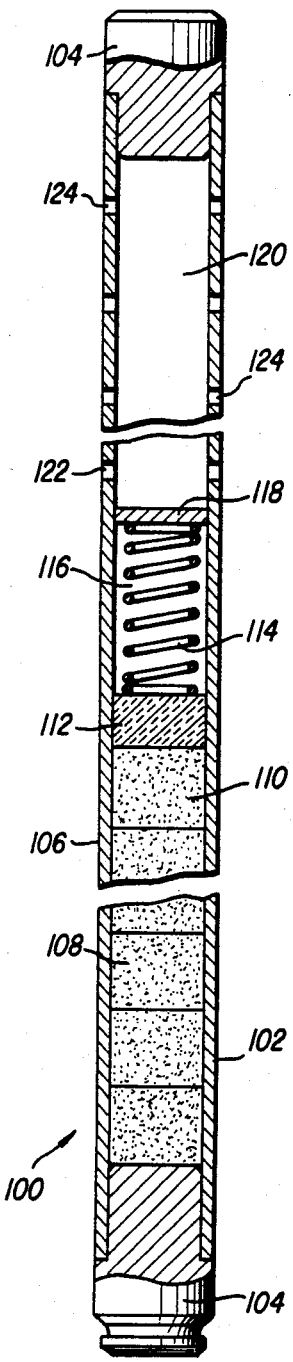
FIG. 1 is a plan, fragmentary view in partial section of the segmented fuel and moderator rod.

Reference will now be detailed to the present preferred embodiment of the invention, an example of which is illustrated in the accompanying drawings. Turning first to FIG. 1, there is illustrated an exemplary segmented fuel and moderator rod 100. Rod 100 comprises a metal cladding 102, preferably made from an alloy of zirconium commonly known as Zircaloy. The ends of the segmented rod 100 are sealed by end plugs 104. As will be further explained below, the upper end plug may be opened to provide flow communication from the inside of the rod to the exterior. Contained within the lower portion 106 of the clad 102 is a stacked column 110 of fuel pellets 108. The fuel is preferably in the form of $UO_2$ pellets. Preferably, at the top of the fuel column 110 is a disk 112 made of a nonfissionable ceramic material against which a spring 114 is seated. The spring 114 contacts the disk 112 and a zircaloy disk 118 in order to define therebetween a fission gas plenum 116. As will be further understood from the explanation below, the disk 118 is preferably welded to the clad 102 to form a water tight seal therewith. The fission gas plenum 116 is used to provide a region in which fission gas from the nuclear fuel may collect as the fuel burns up. The region 120, disposed between the disk 118 and the upper end plug 104, is a moderator flow region. Subcooled coolant moderator enters the region 120 through holes or apertures 122 which are formed in the clad just above the disk 118. The subcooled coolant moderator, typically having a 0-20 percent void or steam fraction, travels upward through the region 120 and exists through hole 124 formed at the top of the region 120. Alternatively, the moderator may flow through apertures (not illustrated) formed in the upper end plug 104.

Figure 3:
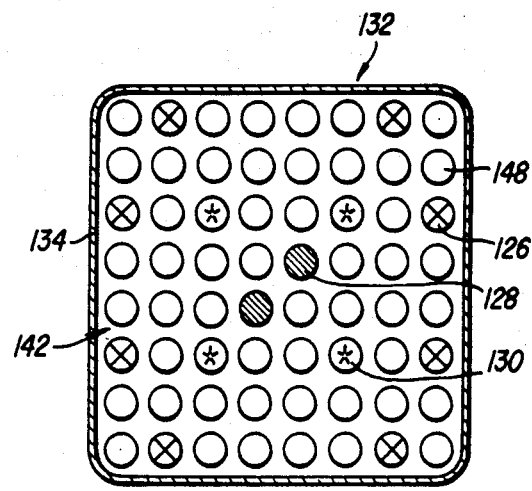
FIG. 3 is a schematic section through the fuel assembly of FIG. 2 showing typical locations of fuel rods, moderator rods, segmented fuel and moderator rods, and tie rods.
Figure 2:
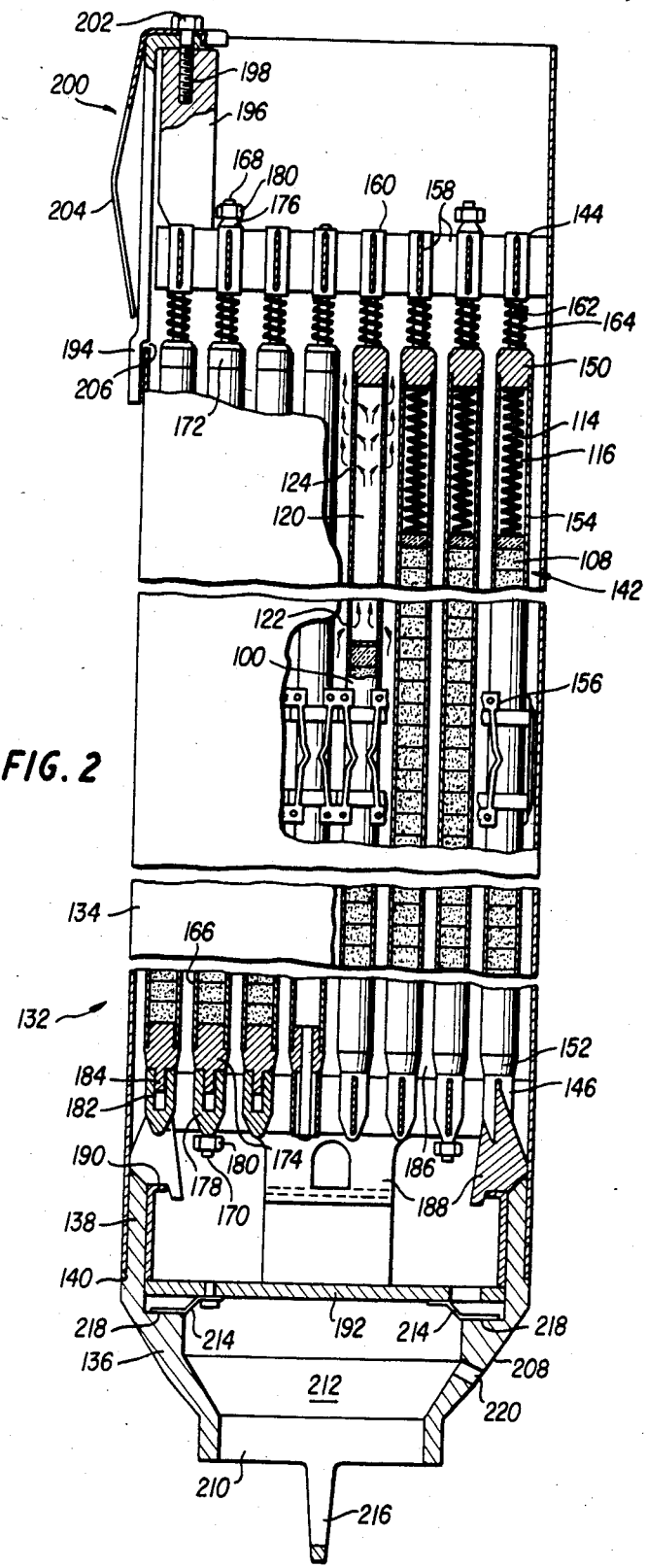
FIG. 2 is a plan, fragmentary view, in partial section of an exemplary fuel assembly showing fuel rods and a segmented fuel and moderator rod.

As illustrated in FIG. 3, in a typical 8×8 fuel bundle, preferably eight of the fuel rods will be tie rods 126 which are bolted to top and bottom tie plates in a manner similar to that described in the above mentioned '995 Patent in order to form a unitary structure. Two of the fuel rod lattice positions are typically occupied by water rods 128 in order to increase the neutron moderation. These water or moderator rods may be constructed in a manner similar to that described in the above mentioned '995 Patent. The typical positioning of segmented fuel and moderator rods 130 near the center of the fuel assembly is illustrated in FIG. 2. This positioning is to provide additional neutron moderator flow in that portion of the fuel assembly which is over enriched and in which the H/U ratio is low as a result of the large steam fraction.

The segmented fuel and moderator rods described above are intended to replace conventional fuel rods in BWR fuel assemblies. Preferably, the moderator region 120 comprises the top one half to one third of the segmented rod which coincides with the region in which BWR fuel assemblies are typically under moderated.

The segmented rods of the present invention will improve fuel utility at the top of the core. While in FIG. 3, four conventional fuel rods are illustrated as being replaced by segmented rods, this should be appreciated that with an 8×8 bundle, anywhere from 2 to 8 conventional fuel rods can be replaced by segmented rods, the exact number being determined from design considerations and based upon how many conventional fuel rods are replaced by water rods.

In a typical 4×4 mini-bundle of the type described in the above mentioned Ser. No. 368,555 where the fuel assembly includes a water cross, each sixteen rod minibundle will preferably have from one to four conventional fuel rods replaced by segmented rods.

In order to evaluate the benefits of the segmented rods 100, the reactivity increase due to the inclusion of 4-6 segmented rods was evaluated using appropriate computer codes. For this evaluation, an 8×8 fuel assembly design using two centrally located water rods was chosen as a reference. The increase in reactivity at the beginning of life was 1.1% and 1.86% $\Delta\rho$, respectively for the four and six segmented rod, 8×8 fuel assemblies compared with the reference fuel assembly having no segmented rods and with the void content of approximately 70% at the top of the assembly.

It is estimated at the end of life equilibrium cycle core average burnup of 18,000 MWD/MTU this reactivity benefit will be reduced by about 50%. Assuming the top one-third of the segmented rods will contain water, it is estimated that the reactivity increase in a core-wide basis will be about 0.3 to 0.5 percent $\Delta\rho$ at 18,000 MWD/MTU discharge burnup for a six segmented rod assembly. The reactivity benefit of 0.3 to 0.5 $\Delta\rho$ corresponds to a fuel cycle cost benefit of about 1 to 1.5 percent. The exact benefit will depend on the number of segmented rods as well as on which precise axial segments of fuel are replaced by the segmented rods.

Changing the H/U ratio at the top of the core will have an impact on axial power distribution. Depending upon fuel assembly design, it may be necessary to vary the height of water in the segmented rod design in order to maintain an acceptable axial power distribution. However, the axial power distribution of a fuel assembly utilizing segmented rods will be enhanced since there will be a tendency for the axial power to skew at the bottom of the fuel assembly because of more even reactivity distribution between the top and bottom of the core.

A typical 8×8 fuel assembly utilitzing segmented rods will now be described with reference to FIGS. 2 and 3. However, it should be appreciated that this fuel assembly is exemplary only in other fuel assembly designs such as that disclosed in the above mentioned Ser. No. 368,555 will also beneficially utilize the above described fuel rod concept.

The fuel assembly 132 includes an elongated impervious outer flow channel 134 that is preferably formed from zircaloy and that extends substantially along the entire length of the fuel assembly 130 and that structurally interconnects an upper yoke (not illustrated) with a base 136. Preferably, the yoke and the base 136 are formed from reactor grade stainless steel.

Preferably, the flow channel 134 is connected to the base 136 by what may be referred to as a tongue and grove connection formed by the receipt of a lower end of the flow channel against an axially or vertically extending elongated connecting portion 138 with reduced lateral dimensions that extends about the periphery of the base 136. The lower end of the flow channel 134 is also designed to rest against a laterally or radially outwardly extending shoulder 140 that is formed about the periphery of the base 136. Once in position on the shoulder 140 and against the connecting portion 138, the lower end of the flow channel 134 may be secured to the base 136 by threaded retaining screws or the like through a plurality of apertures in the lower end of the flow channel 134 for threaded engagement with elongated threaded apertures formed through the connecting portion 138 of the base 136. Other, equivalent connections also suggest themselves to the artisan. In this manner, each of the four sides of the lower end of the flow channel 134 may be structurally connected with the base 136.

Each fuel assembly further preferably comprises a fuel bundle 142 including an upper tie plate 144, a lower tie plate 146 and a plurality of elongated fuel rods 148 disclosed therebetween. In the 8×8 embodiment, each fuel bundle 142 includes sixty four fuel rod lattice positions and each fuel rod 148 includes an upper end plug 150 and a lower end plug 152 similar to the end plugs 104 described above with respect to FIG. 1. Each fuel rod further comprises a stack of fuel pellets 108 disposed in a fuel rod clad and having a fission gas plenum 116 similar to that described above with respect to the segmented rod 100. A spring 114 is used to maintain the fission gas plenum 116 in he manner described above. In addition, each fuel bundle 142 includes a plurality of spacer grids 156 (only one of which is depicted in FIG. 3 for illustration purposes) spaced apart axially along its length by any suitable means, such as a conventional spacer capture fuel rod. The precise number and configuration of the spacer grids 156 should be selected in accordance with the particular thermal, hydraulic, nuclear and mechanically properties of a specific fuel bundle 142 and fuel assembly 132.

The upper tie plate 144 may be fabricated as a connective series of thin metal bars or strips 152 formed by any convenient means such as by casting, machining, or welding preformed strips. At each of the sixty four fuel rod lattice positions a small cylinder with an aperture 160 is formed to receive with a slip fit an elongated vertical extension 162 of the upper end plug 150 of the fuel rod 148. The slip fit between the upper tie plate 150 and the fuel rods 148 permit relative axial movement therebetween. A plurality of elongated compression springs 164 are disposed over the vertical extensions 162 of the upper end plugs 150 and bear against the lower surface of the upper tie plate 144 to maintain the fuel rods 148 seated in the lower tie plate 146 and to support the upper tie plate 144.

As alluded to above, four to ten fuel rods in each fuel bundle 142 may be tie rods 166 that are used to interconnect, as a unit, the upper tie plate 144, the lower tie plate 146 and the plurality of fuel rods 148. The tie rods 166 include threaded elongated vertical extensions 168 and 170 of their upper and lower end plugs 172 and 174 respectively that pass throughout the apertures 176 and 178 in the upper and lower tie plates for receipt of threaded locking or retaining nuts 180.

The lower tie plate 146 may also include a plurality of fuel rod locating apertures 182 that are disposed at each fuel rod lattice position for receipt of elongated vertical extensions 184 of the lower end plug 152 of the fuel rods 148. The tie rods 166 have lower end plug extensions 170 that pass through apertures 178 in the lower tie plate 146 for receipt of the threaded locking or retaining nuts 180 to enable the entire fuel bundle 142 to be lifted and handled as an entity.

The lattice or grid structure of the lower tie plate 146 defines a plurality of fuel bundle coolant flow spaces 186 formed therethrough in order to provide flow passages for fuel bundle coolant flow along the lengths of the fuel rods 148. A plurality of tie plate legs 188 are formed and extend from the bottom surface of the lower tie plate 146 to receive and be supported by four elongated vertically supporting complimentary shaped supports 190 integrally formed and rising upwards from orifice plate 192. The tie plate legs 188 are also supported by elongated vertically extending chamfered supports 194 which mate with oppositely chamfered surfaces formed in the tie plate legs 188. In this manner, the lower tie plate 146 and thus the fuel bundle 142 is spaced above and securely supported by the base 136.

The fuel assembly 132 may further include a plurality of elongated, laterally extending bumpers 194 for contacting if necessary similarly extending bumpers on adjacent fuel assemblies to provide a minimum spacing and fluid gap between adjacent fuel assemblies. The fuel assembly 132 may further include a mounting post 196 having an elongated threaded aperture 198 formed therein for receiving the spring assembly 200 and an elongated threaded spring assembly retaining bolt 202. The bolt 202 is designed to pass through apertures formed through a bi-directional leaf spring 204 for threaded engagement with the aperture 198 to retain the spring assembly 200 in engagement with the mounting post 196. The bi-directional leaf spring 204 is designed to contact corresponding leaf springs on adjacent fuel assemblies in order to maintain spacing between adjacent fuel assemblies and to transmit loads from one fuel assembly to another in a manner similar to that described in U.S. Letters Pat. No. Re. 27,173. To accommodate the radially outwardly projecting portions of the bumper 194 and of the spring assembly 200, the upper end of the outer flow channel 134 should be provided with the plurality of appropriately configured cutouts 206.

The base 136 includes an inlet nozzle 208 having an inlet opening or aperture 210 for the receipt of coolant or moderator flow.

Disposed above the nozzle inlet 210 is an opening or plenum region 212 for the receipt of coolant or moderator flow and for the distribution thereof to the lower tie plates 146 of the fuel bundle 142 via the orifice plate 192 which is supported on the base 136 by cantilever springs 214. The springs 214 are supported on shoulders 218 on the base 136. Extending downwardly from the inlet nozzle 208 are a plurality of legs 216 that are angled radially inward in order to align the base 136 and thus the fuel assembly 132 with the reactor core internals and within mounting structures (not illustrated) in the fuel storage racks. The flow apertures to 220 may also be formed in the base 136 to admit additional coolant or moderator flow through the fuel assembly.

As will be apparent to the artisan, the moderator region 120 of segmented fuel rods 100 in the fuel bundle 142 should be of sufficient size to introduce sufficient moderator or subcooled water into the upper region of the core to improve the under moderated condition which typically exists there as a result of the high void or steam fraction in the top half of the core. Since water has a higher pressure drop than steam, the fluid entering the inlet holes 122 will tend to be water as opposed to a mixture of water and steam although some steam may be introduced through the inlet holes 122. Preferably, the steam content will be from 0–20% of the total flow through the water region 120 of the segmented rod.

At the top of the core, the void fraction due to steam can be as high as 70%. Therefore, in order to properly moderate the upper region of the fuel assembly, the height of the water region 120 should be varied depending upon the locations of the segmented rods in the core in order to insure a sufficient amount of moderator is present. Once entering the moderator region 120, the void fraction of the moderator will remain essentially constant since no additional heat is added to it. In this regard, it is noted that while the fission gas plenum 116 of the segmented rod 100 of FIG. 1 is disposed above the fuel pellet column 110, it should be appreciated that it could be disposed beneath or within the fuel pellet column. However, disposing the plenum 116 directly beneath the moderator region 120 has the advantage of providing heat insulation between the active fuel 108 and the moderator region 120 to further limit heating of the moderator in the region 120.

The moderator or water region 120 is preferably formed with inlet holes only near the bottom and outlet holes only near the top of the region. Alternatively, inlet and outlet holes can be axially distributed in the cladding along the length of the moderator region 120.

While segmented rods described above are illustrated herein in connection with an 8×8 BWR fuel assembly having one or more fuel water rods, it should be appreciated that the segmented rod concept can be advantageously used with other BWR fuel assembly designs, including but not limited to 7×7 arrays and 4×4 mini-bundle arrays.

The foregoing description of a preferred embodiment of the invention has been presented for purposes of illustration and description. It is not intended to be exhaustive or to limit the invention to the precise form disclosed and obviously many modifications and variations are possible in light of the above teachings. The embodiment was chosen and described in order to best explain the principles of the invention and its practical application to thereby enable those skilled in the art to best utilize the invention and various embodiments in with various modifications as are suited to the particular use contemplated. It is intended that the scope of the invention be defined by the claims appended hereto.

I claim:

1. A continuous segmented fuel and moderator rod for use with a water cooled and moderated nuclear fuel assembly, said rod comprising:
   (a) a lower fuel region containing a column of nuclear fuel;
   (b) a moderator region, disposed axially above the fuel region, said moderator region having means for admitting and passing said water moderator therethrough for moderating an upper portion of the nuclear fuel assembly, said moderator region being separated from said fuel region by a water tight separator.

2. The segmented rod of claim 1 further comprising a cladding for containing said lower fuel region and said moderator region, and said lower fuel region further containing a fission gas plenum region disposed between said column of neclear fuel and said moderator region.

3. The segmented rod of claim 2 wherein said separator comprises a disk-shaped separator affixed to said cladding to separate said moderator region from said fuel region.

4. The segmented rod of claim 2 wherein said means for admitting and passing comprises at least one inlet hole in the cladding of said moderator region.

5. The segmented rod of claim 4 wherein said means for admitting and passing further comprises at least one outlet hole in said cladding near the top of said moderator region for passing flowing moderator out of said moderator region.

6. The segmented rod of claim 4 wherein said moderator comprises subcooled water and said at least one inlet hole in sized and positioned to admit subcooled water having a void fraction of between about 0–20%.

7. The segmented rod of claim 5 wherein said at least one outlet hole is positioned to discharge moderator into a region of said nuclear fuel assembly where the void fraction is between about 20–70%.

8. A nuclear fuel assembly for a boiling water reactor (BWR) core comprising:
   (a) a fuel bundle including a plurality of elongate nuclear fuel rods held in a spaced lateral array, each of said fuel rods being positioned in one of a plurality of predetermined lattice positions defined by an upper and a lower tie plate;
   (b) a flow channel for enclosing said fuel bundle;
   (c) a base member, secured to said flow channel and having means for supporting said fuel bundle within said flow channel, said base member further including nozzle for admitting moderator/coolant into said fuel assembly;
   (d) at least one continuous segmented fuel and moderator rod disposed in said fuel bundle in one of said fuel rod lattice positions, said segmented rod including a lower fuel region containing a column of nuclear fuel and an upper moderator region separated from said lower fuel region by a water tight seal, said moderator region having an aperture means for passing said moderator/coolent into and through said moderator region for improving an H/U ratio of an upper portion of said fuel assembly.

9. The nuclear fuel assembly for claim 8 wherein said segmented rod further comprises a cladding for containing said column of nuclear fuel and said moderator region and an upper end plug for mating an upper end of said segmented rod with said upper tie plate and a lower end plug for sealing the bottom of said cladding and for mating a lower end of said segmented rod with said lower tie plate.

10. The nuclear fuel assembly of claim 8 wherein said segmented rod further comprises a fission gas plenum region disposed between said column of nuclear fuel and said moderator region and separated from said moderator region by said water tight seal.

11. The nuclear fuel assembly of claim 10 wherein said water tight seal comprises a disk welded to said cladding and wherein said aperture means comprises at least one inlet flow aperture disposed above said disk.

12. The nuclear fuel assembly for claim 11 wherein said at least one inlet flow aperture is axially located within said fuel assembly at a position where a void fraction of the coolant is between about 0–20%.

13. The nuclear fuel assembly of claim 11 wherein said aperture means further comprises at least one flow outlet aperture for passing moderator out of said moderator region of said segmented rod.

14. A method of moderating a normally undermoderate upper portion of a boiling water reactor (BWR) fuel assembly comprising the steps of:
 (a) passing moderator/coolant through a fuel bundle of said fuel assembly;
 (b) providing at least one continuous, fuel and moderator rod having an upper moderator region and a lower fuel region;
 (c) passing a portion of said moderator/coolant through said moderator region of the segmented rod while maintaining said moderator at a substantially constant void fraction in the range of between 0–20% to thereby improve the H/U ratio at said upper portion of the fuel assembly.

* * * * *